US008644267B2

(12) United States Patent
Sato

(10) Patent No.: US 8,644,267 B2
(45) Date of Patent: Feb. 4, 2014

(54) WIRELESS COMMUNICATION SYSTEM AND METHOD OF CALLING TERMINAL

(75) Inventor: Takeshi Sato, Tokyo (JP)

(73) Assignee: NEC Corporation, Tokyo (JP)

(*) Notice: Subject to any disclaimer, the term of this patent is extended or adjusted under 35 U.S.C. 154(b) by 745 days.

(21) Appl. No.: 12/621,754

(22) Filed: Nov. 19, 2009

(65) Prior Publication Data

US 2010/0124208 A1 May 20, 2010

(30) Foreign Application Priority Data

Nov. 19, 2008 (JP) ................................ 2008-295019

(51) Int. Cl.
H04J 3/00 (2006.01)
(52) U.S. Cl.
USPC ........... 370/336; 370/310; 370/329; 370/328; 455/7; 455/17; 455/19
(58) Field of Classification Search
None
See application file for complete search history.

(56) References Cited

U.S. PATENT DOCUMENTS

| 2002/0018458 A1* | 2/2002 | Aiello et al. | 370/348 |
| 2002/0150066 A1* | 10/2002 | Schilling | 370/335 |
| 2003/0035396 A1* | 2/2003 | Haartsen et al. | 370/336 |
| 2004/0028071 A1* | 2/2004 | Gehring et al. | 370/442 |
| 2008/0182596 A1* | 7/2008 | Wang et al. | 455/458 |
| 2009/0264081 A1 | 10/2009 | Sato | |

FOREIGN PATENT DOCUMENTS

| JP | 05-075523 A | 3/1993 |
| JP | H05252094 A | 9/1993 |
| JP | H11196447 A | 7/1999 |
| JP | 2003304185 A | 10/2003 |
| JP | 3535761 A | 3/2004 |
| JP | 2005-354634 A | 12/2005 |
| JP | 2007323391 A | 12/2007 |
| JP | 2009260756 A | 11/2009 |

OTHER PUBLICATIONS

L. Campelli, et al., "A Receiver Oriented MAC Protocol for Wireless Sensor Networks", IEEE International Conference. Oct. 2007, pp. 1-10.
E. Sozer, et al., "Underwater Acoustic Networks", IEEE Journal of Oceanic Engineering, vol. 25, No. 1, Jan. 2000, pp. 72-83.
Japanese Office Action for JP2008-295019 mailed on Nov. 20, 2012.

* cited by examiner

Primary Examiner — Hassan Phillips
Assistant Examiner — Gautam Sharma
(74) Attorney, Agent, or Firm — Sughrue Mion, PLLC

(57) ABSTRACT

A wireless communication system, including:
a plurality of wireless communication terminals connected to each other in a wired fashion and configuring a cluster; and
a plurality of wireless communication base stations,
wherein each of the wireless communication base stations divides a call signal into short signals, intermittently transmits the signals to the plurality of the wireless communication terminals, and varies transmission timing from one wireless communication base station to another, and
the plurality of the wireless communication terminals receive the call signals from the plurality of the wireless communication base stations in a time division and alternate fashion.

17 Claims, 19 Drawing Sheets

WIRELESS COMMUNICATION SYSTEM AND METHOD OF CALLING TERMINAL

INCORPORATION BY REFERENCE

This application is based upon and claims the benefit of priority from Japanese patent application no. 2008-295019, filed on Nov. 19, 2008, the disclosure of which is incorporated herein its entirety by reference.

BACKGROUND OF THE INVENTION

1. Field of the Invention

The present invention relates to a wireless communication system and a method of calling a terminal, and in particular, to a wireless communication system and a method of calling a terminal that use acoustic communication by means of an acoustic wave.

2. Description of the Related Art

FIG. 18 is a diagram showing a configuration of an example of a wireless communication system related to the present invention. Referring to the figure, the example of the wireless communication system related to the present invention includes two wireless communication terminals (hereinafter represented as "terminals") 101 and 102, a wireless communication base station (hereinafter represented as "base station") 111, and a backbone network 121 connected to the base station 111. These are provided under the sea. Acoustic communication by means of an acoustic wave is used for communication between the terminals 101 and 102 and the base station 111. Although the system includes a plurality of the base stations, illustration of the base stations except the first one is omitted for the sake of convenience. The communication is performed between these terminals and the base stations.

On the other hand, an example of a method of calling a terminal in a wireless communication system including a plurality of terminals and a plurality of base stations is disclosed in Patent Document 1 (Japanese Patent Laid-Open No. 2005-354634). This is an art according to which the base station where a call request has occurred uses the CSMA (Carrier Sense Multiple Access) and transmits a call signal from the own station after confirming that any other station does not transmit the call signal, and the terminal on a reception side performs reception only on a prescribed time, that is intermittent reception.

It is an object of the art described in the Patent Document 1 to reduce power consumption on the reception side by periodically receiving a part of times in a basic frame which is formed with a time length of a call signal, instead of receiving all of the basic frame on the reception side.

Furthermore, a method of dividing a call signal into subframes of short time periods and transmitting the subframes is disclosed in Non-Patent Document 1 (A RECEIVER ORIENTED MAC PROTOCOL FOR WIRELESS SENSOR NETWORKS, CAMPELLI, LUCA; CAPONE, ANTONIO; CESANA, MATTEO; EKICI, EYLEM; MOBILE ADHOC AND SENSOR SYSTEMS, 2007. MASS 2007. IEEE INTERNATIONAL CONFERENCE ON 8-11 Oct. 2007, p(s). 1-10). Moreover, an art related to a simple random access system (AROHA system) is disclosed in Non-Patent Document 2 (UNDERWATER ACOUSTIC NETWORKS, ETHEMM. SOZER; MILICA STOJANOVIC, JOHN PROAKIS; IEEE JOURNAL OF OCEANIC ENGINEERING, VOLUME 25, NO. 1, January 2000, p(s). 72-83). Furthermore, among wireless communication networks using an underwater sound, there is an underwater acoustic communication system where every terminal is separately and individually disposed as shown in Non-Patent Document 2.

Moreover, a method of intermittent reception reducing power consumption of a mobile station and downsizing the mobile station is disclosed in Patent Document 2 (Japanese Patent Laid-Open No. 05-075523). This is an art that configures a superframe bundling a plurality of frames corresponding to respective time slots of a plurality of groups of mobile stations, varies the number of time slots to be assigned in the superframe on a group basis, and varies intermittent reception rates from one group to another.

Furthermore, another method of intermittent reception reducing power consumption of a mobile station and downsizing the mobile station is disclosed in Patent Document 3 (Japanese Patent No. 3535761). This varies time intervals of intermittent reception in a fashion analogous to the above-mentioned art described in the Patent Document 2. For instance, although this usually performs the intermittent reception in a basic cycle, this varies the time intervals of intermittent reception when neither origination of a call nor an incoming call occurs for a prescribed time period, or varies the intervals on every constant or variable prescribed time period.

However, the art described in the Patent Document 1 to which the CSMA is applied has a problem, the so-called "hidden terminal problem", where wireless signals transmitted from the respective base stations overlap with each other at the terminal and thereby the terminal becomes unable to receive the wireless signals when communication paths between base stations are not secured. If the problem arises, the system becomes equal to the simple random access system shown in the above-mentioned Non-Patent Document 2.

For instance, according to the system described in the Non-Patent Document 2, when the "hidden terminal problem" arises, transmission of call signals from two base stations during the basic frame time period increases the possibility of overlap between the two call signals on an intermittent reception time on the reception side. Occurrence of three or more call signals unavoidably causes an unreceivable overlap. It is required that the base station having transmitted the unreceivable call signal waits for an ACK (ACKNOWLEDGE) signal from the terminal until timeout.

Furthermore, the art described in the above-mentioned Patent Document 1 is a method for a system where every terminal connected to the system is temporally synchronized. Since the method determines the time on which the call signal is transmitted in the network, there is a problem where the flexibility of transmission timing of the call signal is low.

Moreover, according to the system described in the Non-Patent Document 2, it is required that a reception status be kept on every basic frame in order to monitor the call signal from the base station as with the art in the above-mentioned Patent Document 1.

Furthermore, a cluster system (a system where a plurality of terminals are connected to each other via wires) has a problem where the cluster becomes unable to receive the call signal when some terminals of the cluster become unable to receive call signals owing to a difficulty in propagation situations such that the terminals are hidden behind a rock.

As shown in a timing chart on an example of a call signal from a base station in the related art in FIG. 19, occurrence of a certain delay in transmission time from the base station 111 to terminals 101 and 102 may cause a case where neither terminal 101 nor 102 can receive the signal from the base station 111.

SUMMARY

An exemplary object of the invention is to solve the hidden terminal problem, and to provide a wireless communication system and a method of calling a terminal that has higher flexibility in transmission timing of a call signal than the related art, obviates necessity of reception on a basic frame basis, and enables the cluster to receive the call signal even if the terminal is hidden behind a rock.

An exemplary aspect of the invention is a wireless communication system, including:

a plurality of wireless communication terminals connected to each other in a wired fashion and configuring a cluster; and a plurality of wireless communication base stations, wherein each of the wireless communication base stations divides a call signal into short signals, intermittently transmits the signals to the plurality of the wireless communication terminals, and varies transmission timing from one wireless communication base station to another, and the plurality of the wireless communication terminals receive the call signals from the plurality of the wireless communication base stations in a time division and alternate fashion.

Another exemplary aspect of the invention is a method of calling a terminal in a wireless communication system that includes a plurality of wireless communication terminals connected to each other in a wired fashion and configuring a cluster, and a plurality of wireless communication base stations, wherein the wireless communication base station divides a call signal into short signals, intermittently transmits the signals to the plurality of the wireless communication terminals, and varies transmission timing from one wireless communication base station to another, and the plurality of the wireless communication terminals receive the call signals from the plurality of the wireless communication base stations in a time division and alternate fashion.

EXEMPLARY EMBODIMENTS

Figure 1:
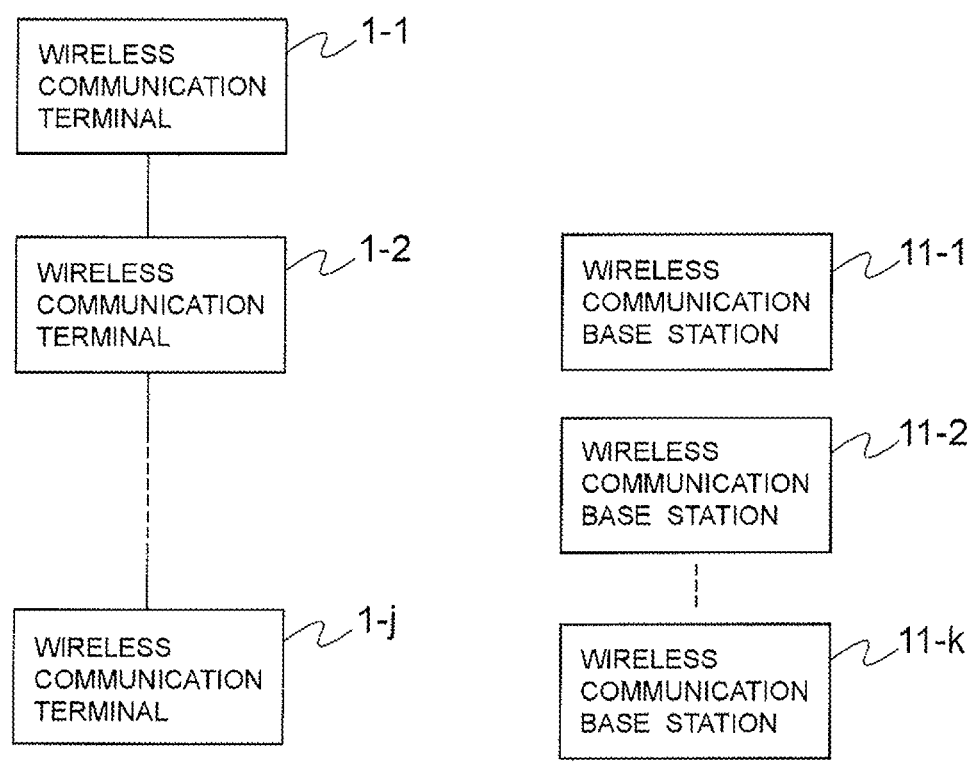
FIG. 1 is a diagram showing a configuration of an example of a wireless communication system according to the present invention.

First of all, an operational principle of the present invention will be described before a description on exemplary embodiments of the present invention. FIG. 1 is a diagram showing a configuration of an example of a wireless communication system according to the present invention. Referring to the figure, the example of the wireless communication system according to the present invention includes a plurality of wireless communication terminals 1 (1-1, 1-2, . . . , 1-$j$; $j$ is a natural number) connected to each other via wires and configuring a cluster, and a plurality of wireless communication base stations 11 (11-1, 11-2, . . . , 11-$k$; $k$ is a natural number). The cluster configuration refers to a system whose plurality of wireless communication terminals 1 are connected to each other via wires as shown in the figure. Hereinafter, the wireless communication terminal is represented as the "terminal" and the wireless communication base station is represented as the "base station".

Each base station 11 transmits a call signal to the plurality of terminals 1. Each base station 11 divides the call signal into several short signals and intermittently transmits the signals to the plurality of terminals 1, and varies the transmission timing from one base station 11 to another. The plurality of terminals 1 receive the call signals from the plurality of base stations 11 in a time division and alternate fashion.

The present invention utilizes a feature that enables a call for any terminal connected to the cluster when at least one terminal among the terminals connected to the cluster can receive the call signal from the base station by wireless signal.

As described above, the present invention divides the call signal from the base station 11 into several short signals and varies the transmission timing from one base station 11 to another, thereby solving the hidden terminal problem and enabling higher flexibility in transmission timing of the call signal than the related art. Furthermore, according to the present invention, an advantageous effect obviating necessity of reception on a basic frame basis in the plurality of terminals 1 is exerted by the plurality of terminals 1 receiving the call signal from the base station 11 in the time division and alternate fashion.

Moreover, a wireless communication system in the related art where each terminal does not configure a cluster and exists individually necessitates to be kept in a reception state in order to monitor the call signal from the base station. In contrast to this, according to the present invention, the terminal connected to the cluster monitors the call signal from the base station in a time division and alternate fashion, thereby reducing reception signals and enabling reduction in power consumption to be actualized.

Furthermore, the present invention varies the signal length of the call signal from the base station 11, thereby enabling the cluster to receive the call signal even if the terminal is hidden behind a rock.

Figure 2:
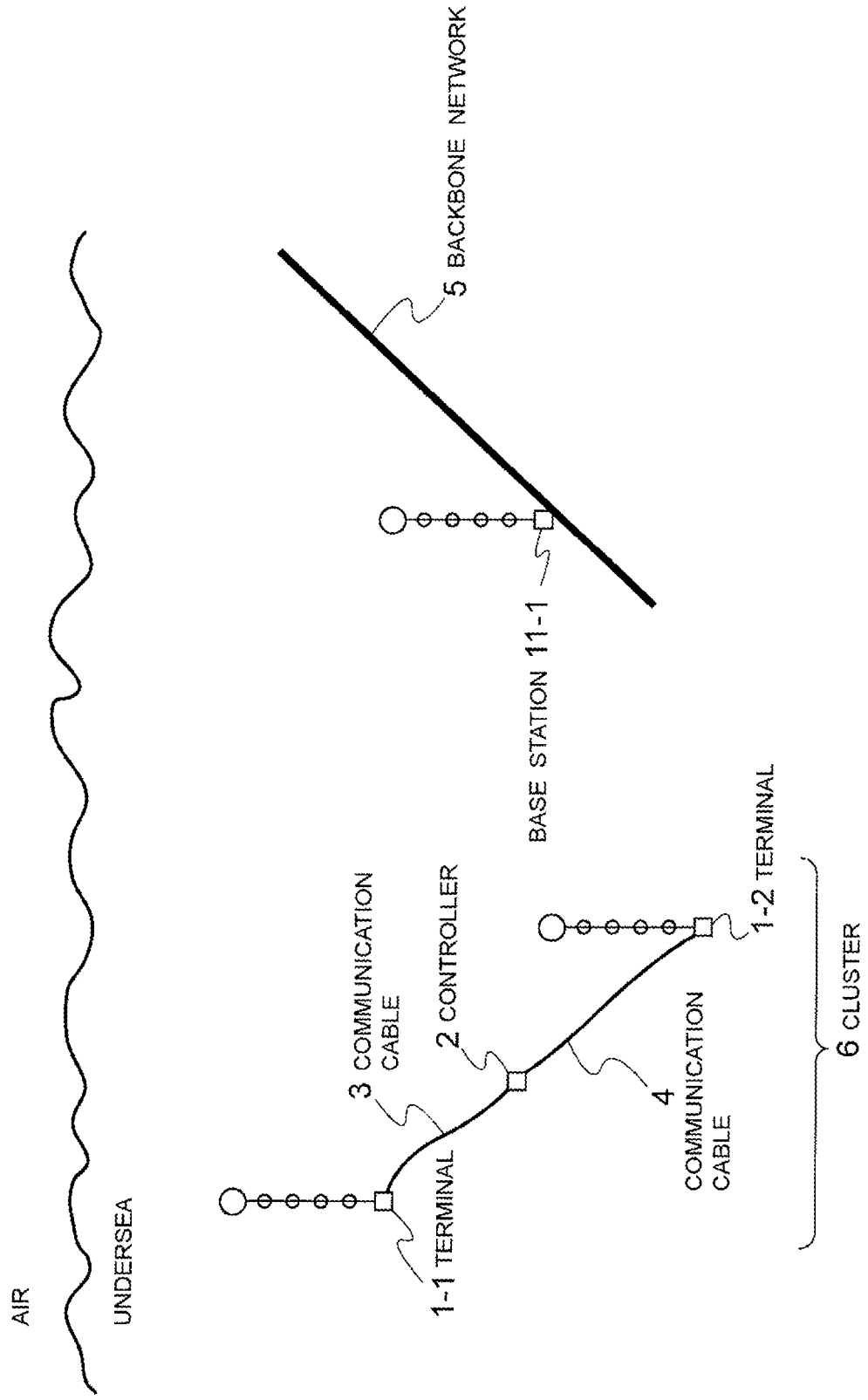
FIG. 2 is a diagram showing a configuration of a first exemplary embodiment of the wireless communication system according to the present invention.

Hereinafter, exemplary embodiments of the present invention will be described. First of all, a first exemplary embodiment will be described. FIG. 2 is a diagram showing a configuration of the first exemplary embodiment of the wireless communication system according to the present invention. It should be noted that elements equal to those in FIG. 1 are assigned with identical numerals and description thereof is omitted.

Referring to FIG. 2, the first exemplary embodiment of the wireless communication system according to the present invention includes wireless communication terminals (hereinafter represented as the "terminals") 1-1 and 1-2, a controller 2, communication cables 3 and 4, a wireless communication base station (hereinafter represented as the "base station") 11-1, and a backbone network 5.

The terminal 1-1 is connected to the controller 2 via the communication cable 3. The terminal 1-2 is connected to the controller 2 via the communication cable 4. These terminals 1-1 and 1-2, controller 2, and communication cables 3 and 4 configure a cluster 6. The base station 11-1 is connected to the backbone network 5.

The terminals 1-1 and 1-2 are underwater acoustic communication terminals. The terminals 1-1 and 1-2, the controller 2, the communication cables 3 and 4, the base station 11-1, and the backbone network 5 are provided under the sea in conjunction with one another. Communication between every terminal 1-1 and 1-2 and the base station 11-1 is performed by means of acoustic communication using an acoustic wave having equal carrier/transmission frequencies. Data transmission between the terminals 1-1 and 1-2 is performed by means of wired communication using the communication cables 3 and 4.

In the exemplary embodiment shown in FIG. 2, for instance, only the two terminals and one base station are shown as the wireless communication system for the sake of convenience. However, in the following exemplary embodiments including this exemplary embodiment, the wireless communication system actually comprises a plurality of terminals and base stations. The plurality of base stations are connected to the backbone network 5. In other words, the present invention can be applied to three or more terminals and base stations.

Figure 3:
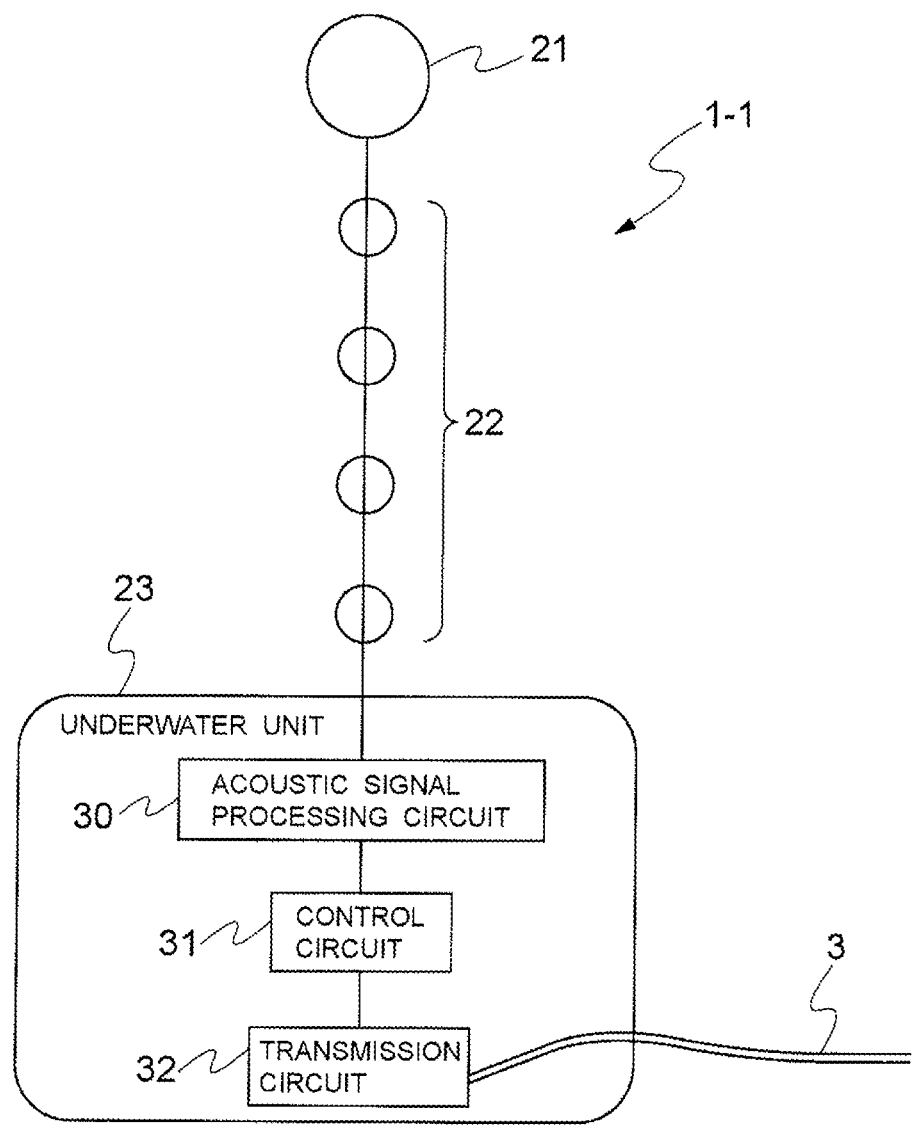
FIG. 3 is a diagram showing a configuration of a terminal 1-1 of the first exemplary embodiment according to the present invention.

FIG. 3 is a diagram showing a configuration of the terminal 1-1 of the first exemplary embodiment according to the present invention. It should be noted that elements equal to those in FIG. 2 are assigned with identical numerals and description thereof is omitted. Since the configuration of the terminal 1-2 is equal to that of the terminal 1-1, description thereof is also omitted. Referring to FIG. 3, the terminal 1-1 includes a buoy 21, a transmitter/receiver 22, an underwater unit 23, and the communication cable 3.

The buoy 21 is to vertically deploy the transmitter/receiver 22. The transmitter/receiver 22 transmits and receives an acoustic signal. The underwater unit 23 includes an acoustic signal processing circuit 30, a control circuit 31, and a transmission circuit 32. The acoustic signal processing circuit 30 demodulates an acoustic signal from a receiver in the transmitter/receiver 22, and outputs the demodulated signal to a transmitter in the transmitter/receiver 22. The control circuit 31 controls transmission and reception in the transmitter/receiver 22 on the basis of information from the transmission circuit 32. The transmission circuit 32 is connected to the communication cable 3, and processes the data to be transmitted and received via the communication cable 3.

Figure 4:
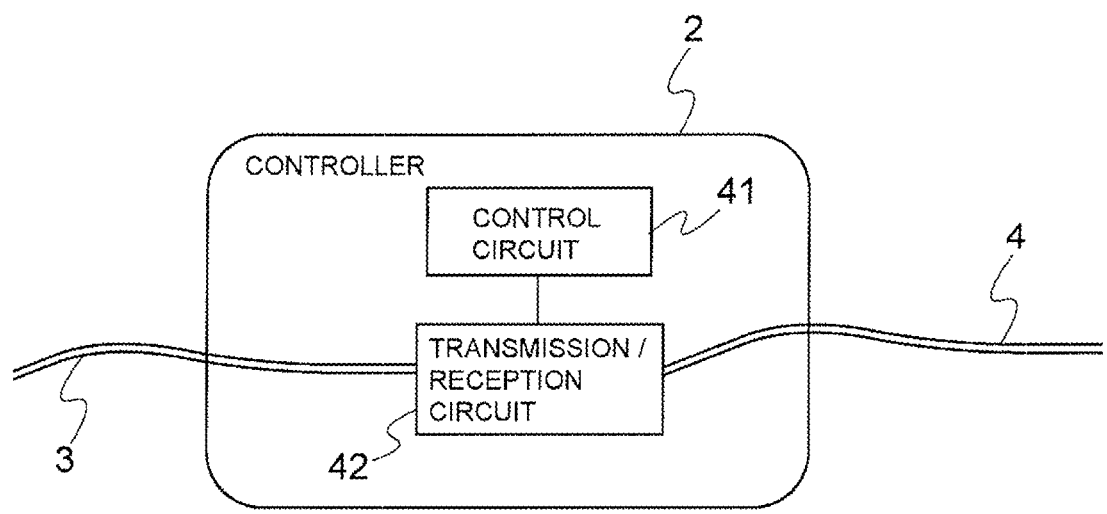
FIG. 4 is a diagram showing a configuration of a controller 2 of the first exemplary embodiment according to the present invention.

FIG. 4 is a diagram showing a configuration of the controller 2 of the first exemplary embodiment according to the present invention. It should be noted that elements equal to those in FIG. 2 are assigned with identical numerals and description thereof is omitted. Referring to FIG. 4, the controller 2 includes a control circuit 41 and a transmission/reception circuit 42. The communication cables 3 and 4 are connected to the transmission/reception circuit 42. The control circuit 41 creates a control signal on the basis of information inputted from the transmission/reception circuit 42, and outputs the control signal to the transmission/reception circuit 42. The transmission/reception circuit 42 transmits/receives data via the cables 3 and 4, and outputs data to the control circuit 41.

Figure 5:
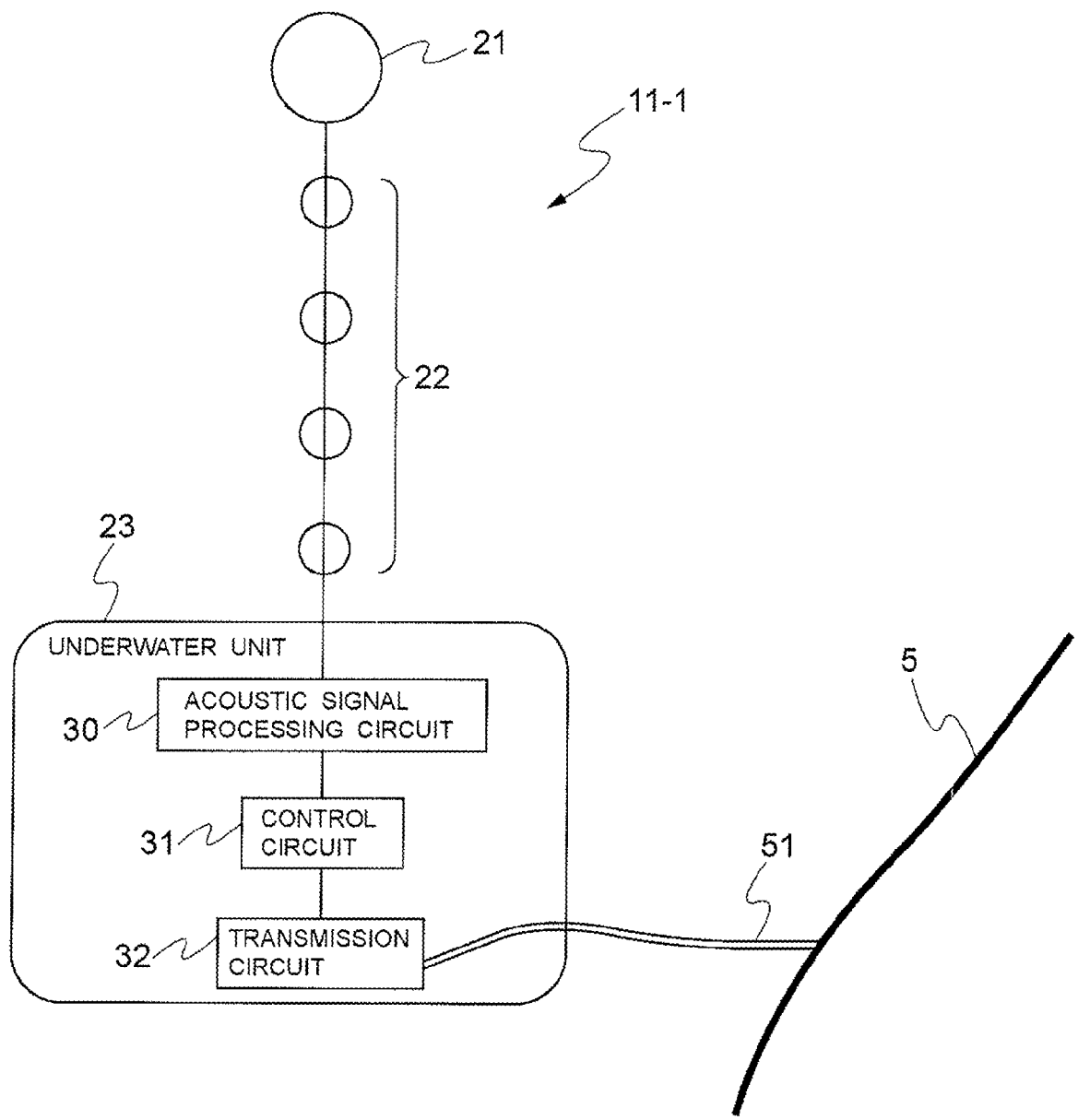
FIG. 5 is a diagram showing a configuration of a base station 11-1 of the first exemplary embodiment according to the present invention.

FIG. 5 is a diagram showing a configuration of the base station 11-1 of the first exemplary embodiment according to the present invention. It should be noted that, since the buoy 21, transmitter/receiver 22 and the underwater unit 23 have configurations equal to those of the terminal 1-1 represented in FIG. 3, numerals equal to those of the terminal 1-1 are assigned thereto. Elements equal to those in FIG. 1 are also assigned with equal numerals.

Referring to FIG. 5, the base station 11-1 includes the buoy 21, the transmitter/receiver 22, the underwater unit 23, a communication cable 51, and the backbone network 5. The transmission circuit 32 in the underwater unit 23 is connected to the backbone network 5 via the communication cable 51.

Figure 18:
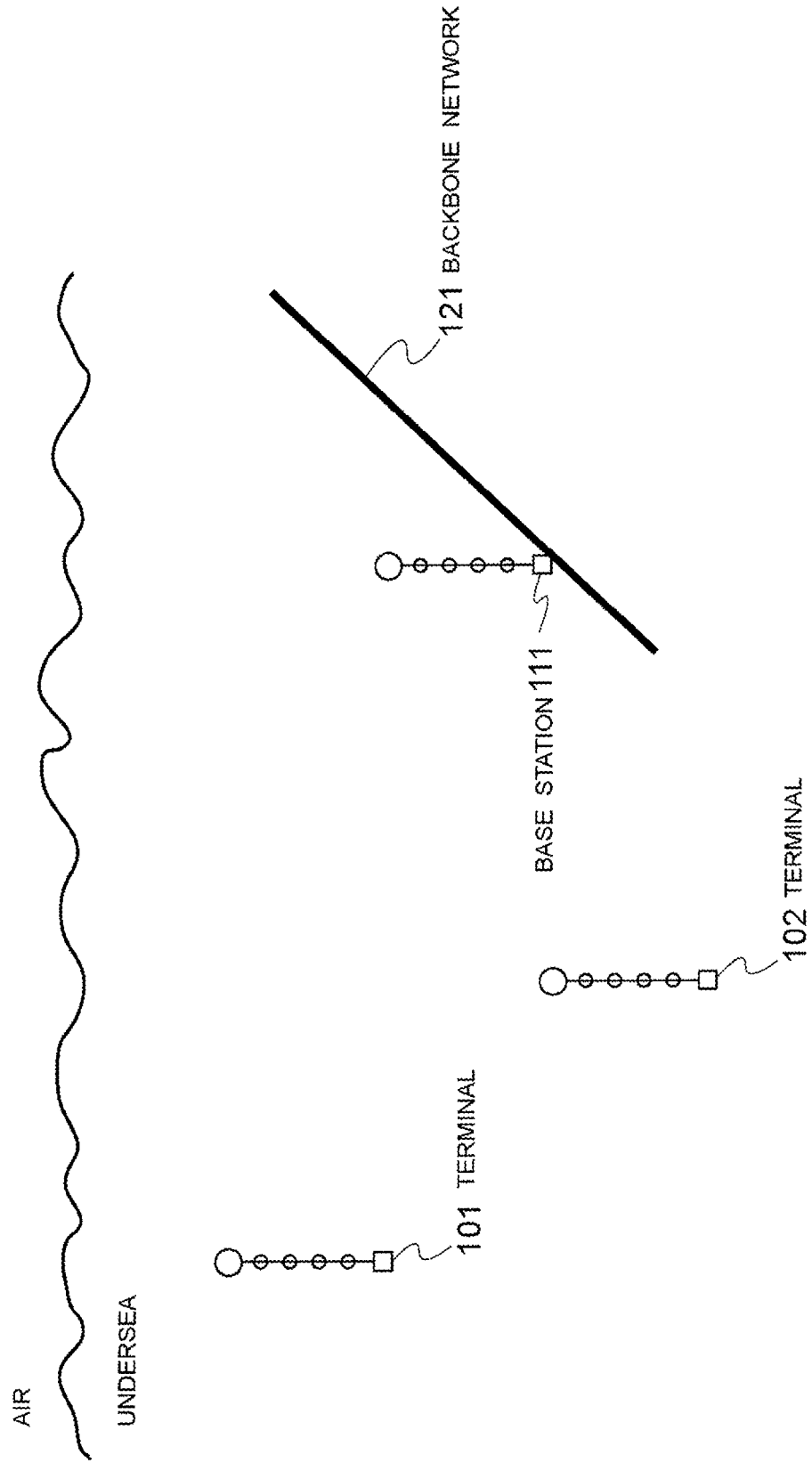
FIG. 18 is a diagram showing a configuration of an example of a wireless communication system related to the present invention.

Next, operation of the first exemplary embodiment will be described. Difference in the configuration of the communication system according to the present invention shown in FIG. 2 from the configuration of the related communication system shown in FIG. 18 is that, although the communication system of the present invention has the cables 3 and 4 and the controller 2, the related communication system does not have these.

Figure 6:
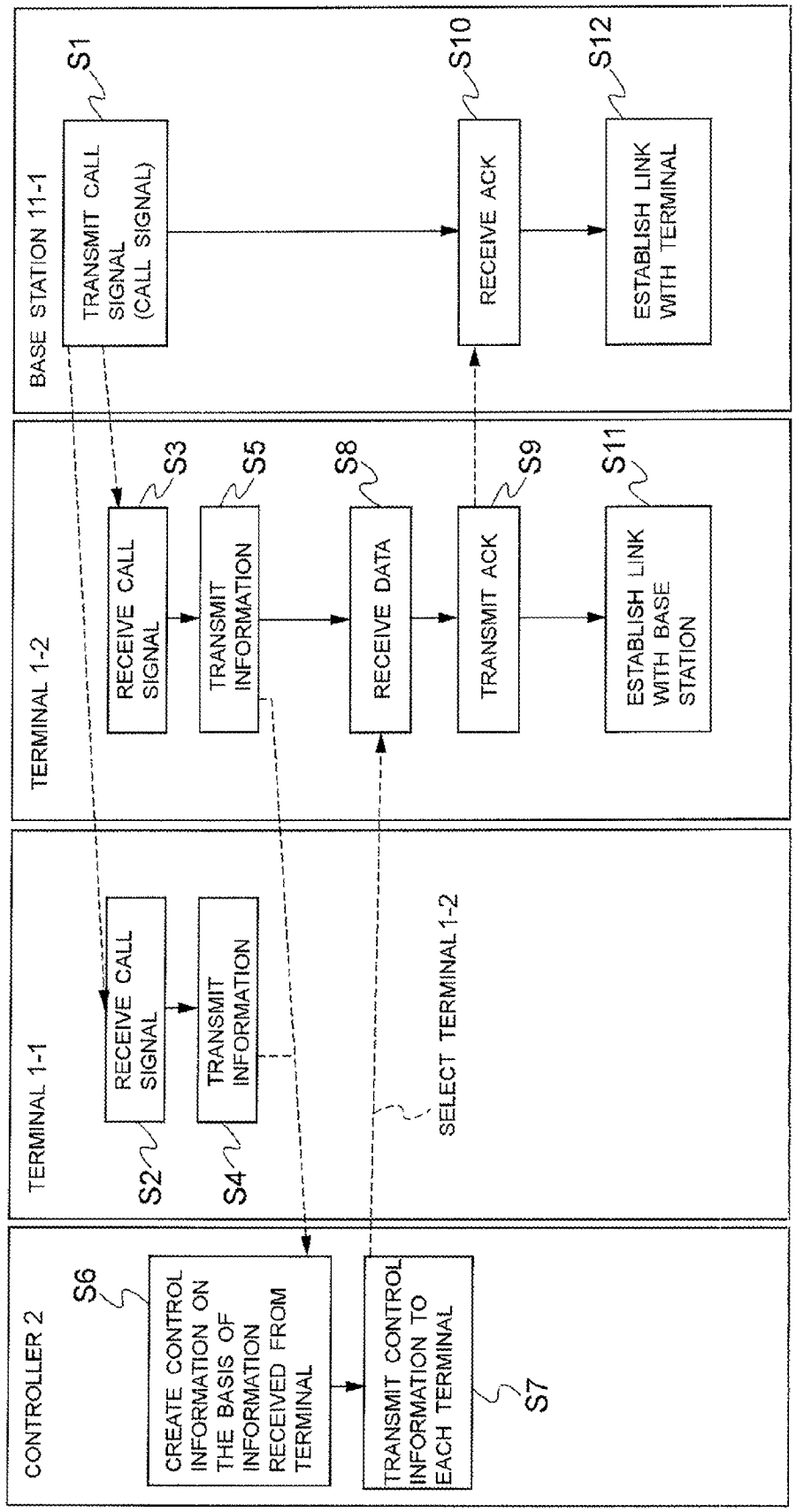
FIG. 6 is a sequence chart showing an operation according to the first exemplary embodiment.

FIG. 6 is a sequence chart showing the operation of the first exemplary embodiment. Referring to the figure, an example of a communication procedure when the base station calls the terminal in the cluster and transmits data will be described.

First of all, the base station 11 transmits the call signal to the terminals 1-1 and 1-2 (step S1). As the call signal, a tone signal used in the wireless network is transmitted. Next, the terminal 1-1 receives the signal (step S2), and the terminal 1-2 receives the signal (step S3).

Next, the terminal 1-1 transmits necessary information to the controller 2 via the communication cable 3 (step S4), and the terminal 1-2 transmits the necessary information to the controller 2 via the communication cable 4 (step S5). This necessary information is information for causing the controller 2 to determine which terminal (1-1 or 1-2) is made to acoustically communicate with the base station 11-1, and here is exemplified as a reception level of the call signal from the base station at each of the terminals 1-1 and 1-2.

The controller 2 creates control information on the basis of the necessary information (step S6). The controller 2 transmits the control information to each terminal (step S7). More specifically, the controller 2 determines the terminal detecting higher reception level than the other as the terminal to acoustically communicate with the base station, and transmits the determination to the terminal via the communication cable 3 or 4. In the exemplary embodiment, the determination information from the controller 2 that indicates the terminal 1-2 is selected is transmitted to the terminal 1-2.

The terminal 1-2 receives the determination information from the controller 2 (step S8). Next, the terminal 1-2 transmits an ACK signal to the base station 11-1 (step S9). The base station 11-1 receives this ACK signal (step S10). Thus, the terminal 1-2 establishes a link to the base station 11-1 (step S11). The base station 11-1 establishes a link to the terminal 1-2 (step S12).

Next, an example of transmission and reception operation when the base station 11-1 transmits the call signal (step S1) and the terminals 1-1 and 1-2 receive the call signal (steps S2 and S3) will be described.

Figure 7:
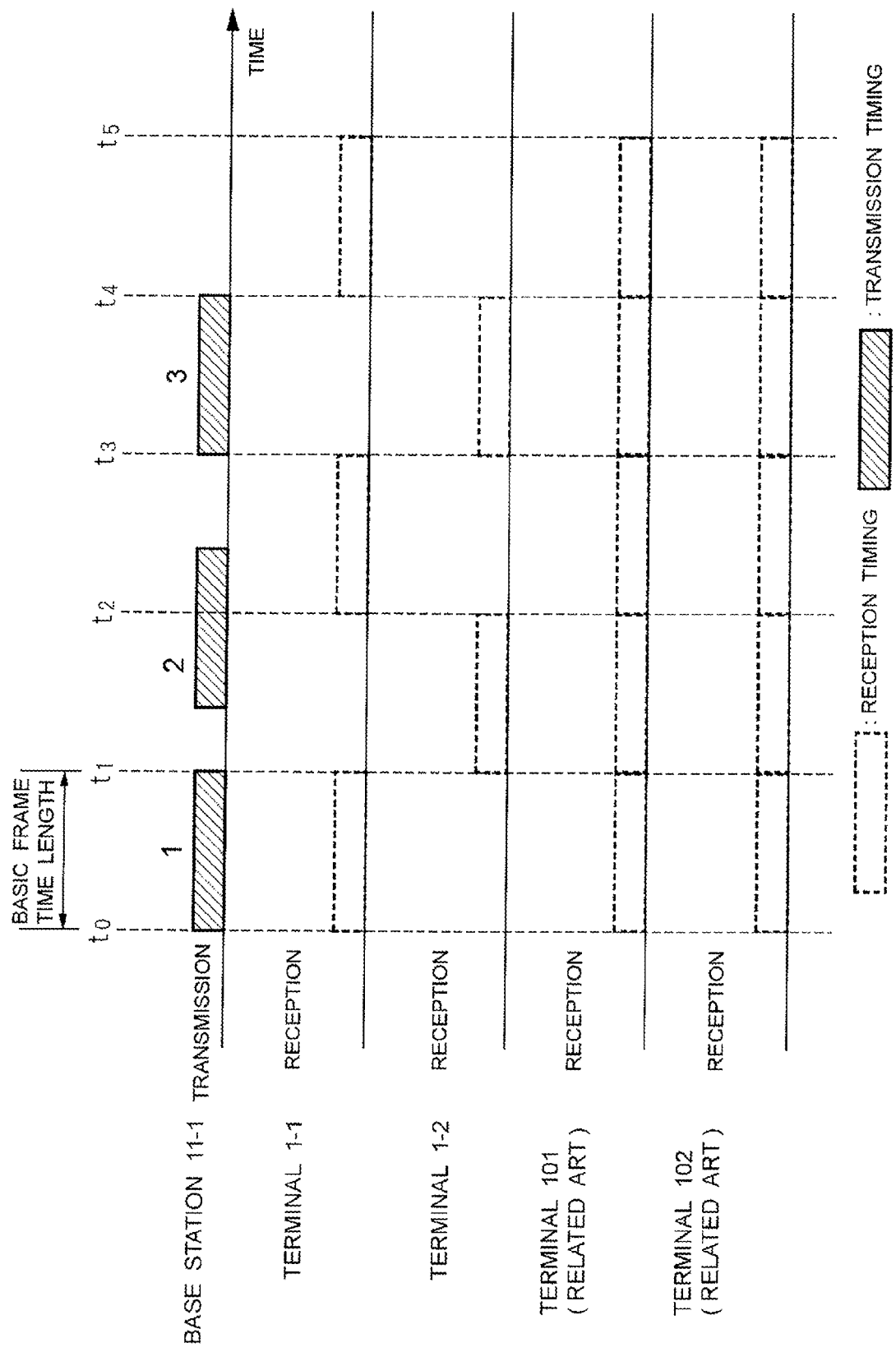
FIG. 7 is a sequence chart showing an example of an operation of transmitting and receiving a call signal from the base station according to the first exemplary embodiment.

FIG. 7 is a sequence chart showing an example of the operation of transmitting and receiving the call signal from the base station according to the first exemplary embodiment. It should be noted that the figure also represents operation of the terminals 101 and 102 in the related art and illustrates a case without any propagation delay from the base station to the terminal in order to clearly point up the difference in exemplary advantage from that of the related art.

The figure represents the time t0, t1, t2, ..., t5 on the abscissa. The length from t0 to t1 indicates a basic frame time length, and the intervals from t2 to t3, from t3 to t4 and from t4 to t5 also indicate the basic frame time length having a length equal to that from t0-t1.

An exemplary advantage according to the first exemplary embodiment is that the terminals 1-1 and 1-2 actualizes reduction in power consumption by performing alternate reception on a basic frame time length basis as shown in the figure. In the figure, when the call signal is transmitted from the base station 11-1 on the timing "1" (from t0 to t1), the terminal 1-1 receives the signal. The terminal 1-2 does not receive the signal at this timing. In the communication system according to the present invention, however, the terminals 1-1 and 1-2 are connected via the communication cables 3 and 4, thereby allowing the terminals to respond to the call from the base station 11-1, provided that any one of the terminals 1-1 and 1-2 can receive the signal as the cluster.

On the other hand, when the call signal is transmitted from the base station 11-1 on the timing "2" (a basic frame time length within an interval from t1 to t3), each of the terminals 1-1 and 1-2 can receive only a part of the call signal. The exemplary embodiment is configured such that a response to the call signal from the base station 11-1 can be made even in this case. It will be described later whether the reception is performed or not depending on how much the call timing and the reception timing overlap.

Next, when the call signal is transmitted from the base station 11-1 on the timing "3" (from t3 to t4), the terminal 1-2 can receive the signal, but the terminal 1-1 cannot receive the signal, in contrast to the case of the timing "1". However, since the terminals 1-1 and 1-2 exist in the same cluster, the terminals can respond to the call from the base station 11-1.

In contrast to that, in the related art, as shown in the figure, it is required that the terminals 101 and 102 always continue reception in order to respond to the call signal from the base station 11-1.

On the other hand, the present invention simply reduces the reception time period at each of the terminals 1-1 and 1-2 by one-half. Furthermore, if the number of the terminals connected to the cluster increases to 3, 4, . . . , the reception time period is simply reduced by one-third, one-forth, . . . , thereby actualizing reduction in power consumption.

Figure 8:
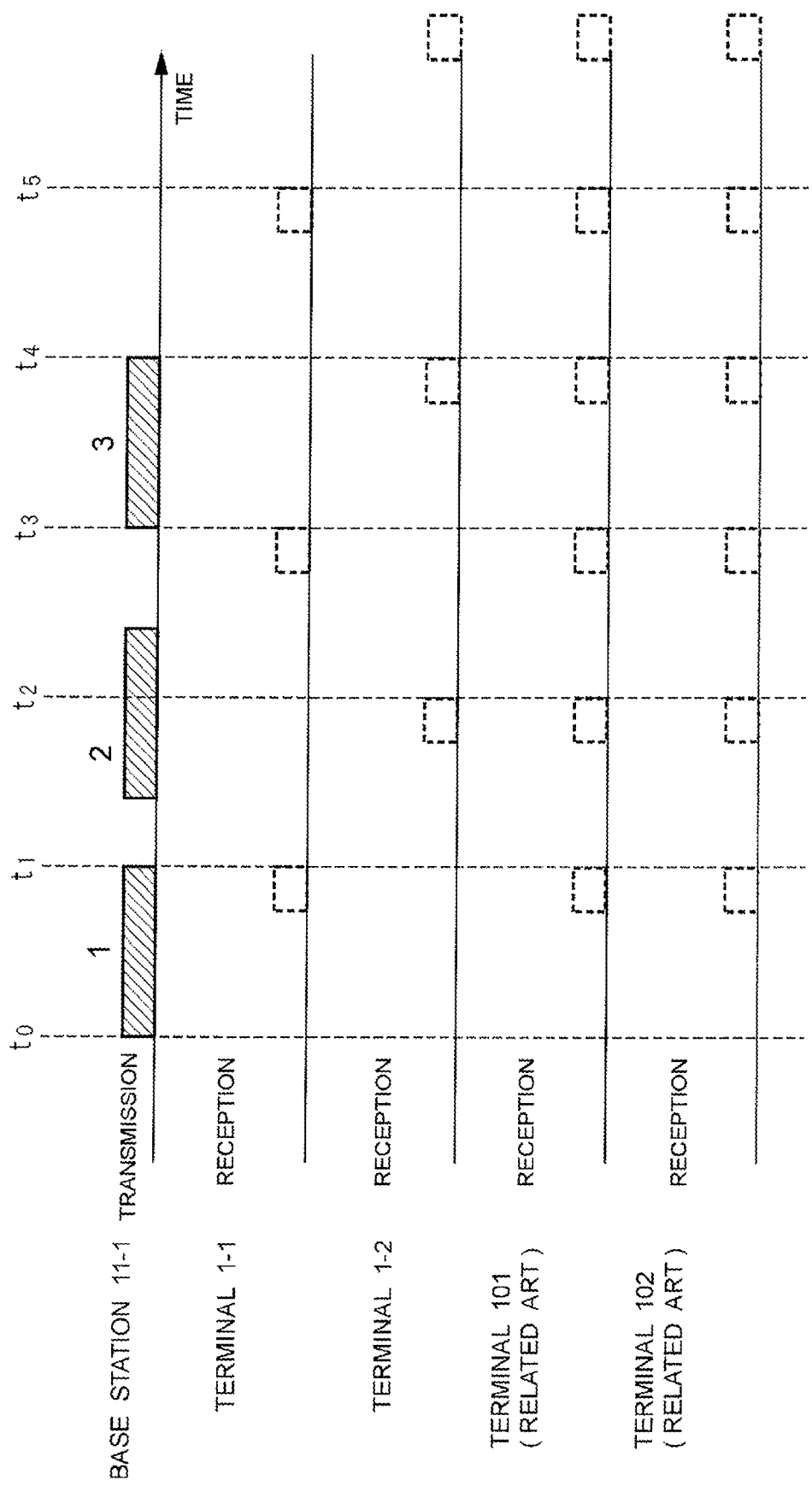
FIG. 8 is a sequence chart showing an example of an operation of transmitting and receiving the call signal from the base station according to a second exemplary embodiment.

Next, a second exemplary embodiment will be described. The configuration of a communication system of the second exemplary embodiment is equal to that shown in FIGS. 2 to 5. FIG. 8 is a sequence chart showing an example of the operation of transmitting and receiving the call signal from the base station according to the second exemplary embodiment.

In the first exemplary embodiment shown in FIG. 7, the terminals 101 and 102 perform reception on a basic frame time length basis. However, intermittent reception can be performed as shown in FIG. 8. An exemplary advantage according to the second exemplary embodiment, even in this case, is that the terminals 1-1 and 1-2 can perform reception irrespective of the reception timing when the call signal reaches provided that the terminals 1-1 and 1-2 receive on an alternate frames basis. In contrast to that, in the related art, it is required that the terminals 101 and 102 receive on an every frame basis as shown in the figure.

Next, a third exemplary embodiment will be described. The configuration of a communication system of the third exemplary embodiment is equal to that shown in FIGS. 2 to 5. The third exemplary embodiment relates to measures in a case where a delay exists in data propagation from the base station 11-1 to the terminals 1-1 and 1-2.

Figure 19:
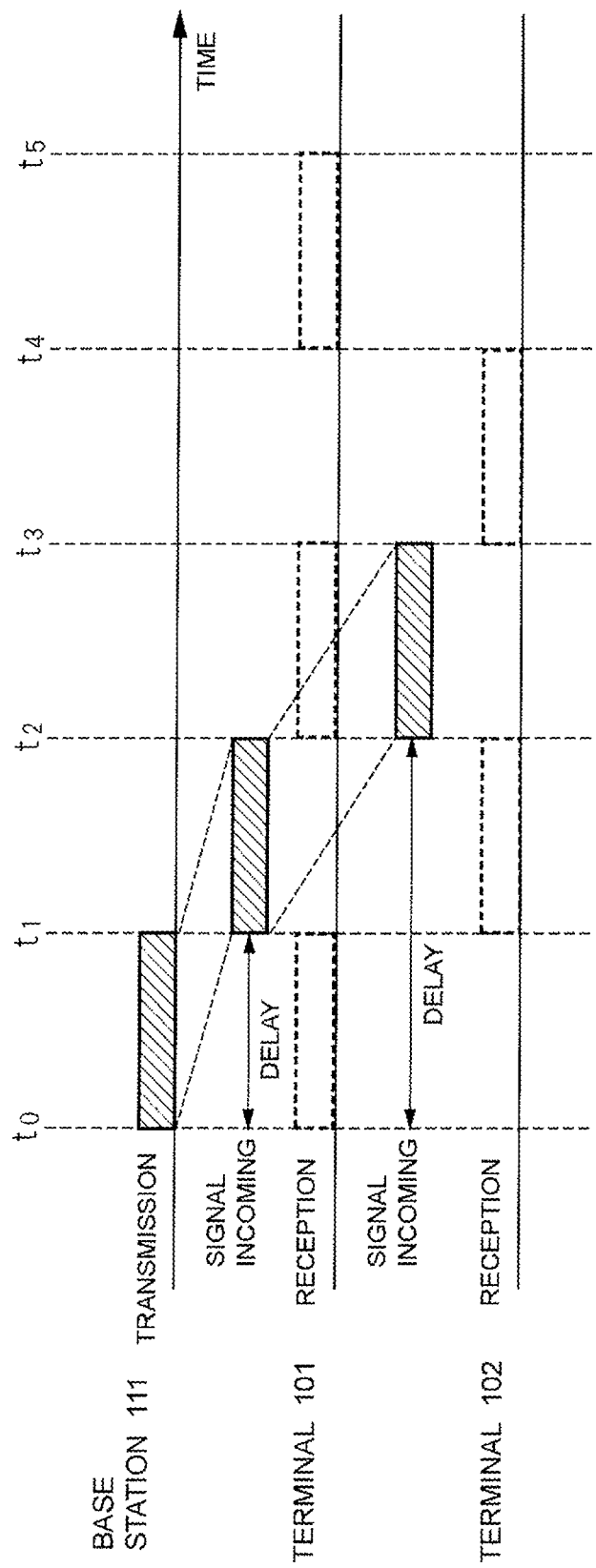
FIG. 19 is a timing chart showing an example of the call signal from the base station according to the related art.

Referring to the above-mentioned FIG. 19, there is a possibility that a propagation delay time period for the terminal 101 becomes one unit of the basic frame time length (from t0 to t1) and a propagation delay time period for the terminal 102 becomes two units of the basic frame time length (from t0 to t2). In this case, since the call signal reaches at the time when each of the terminals 101 and 102 does not receive, neither terminal 101 nor 102 can receive the call signal from the base station 111. As shown in FIG. 8, this problem becomes increasingly apparent when the reception time period of each of terminals 101 and 102 is reduced.

Figure 9:
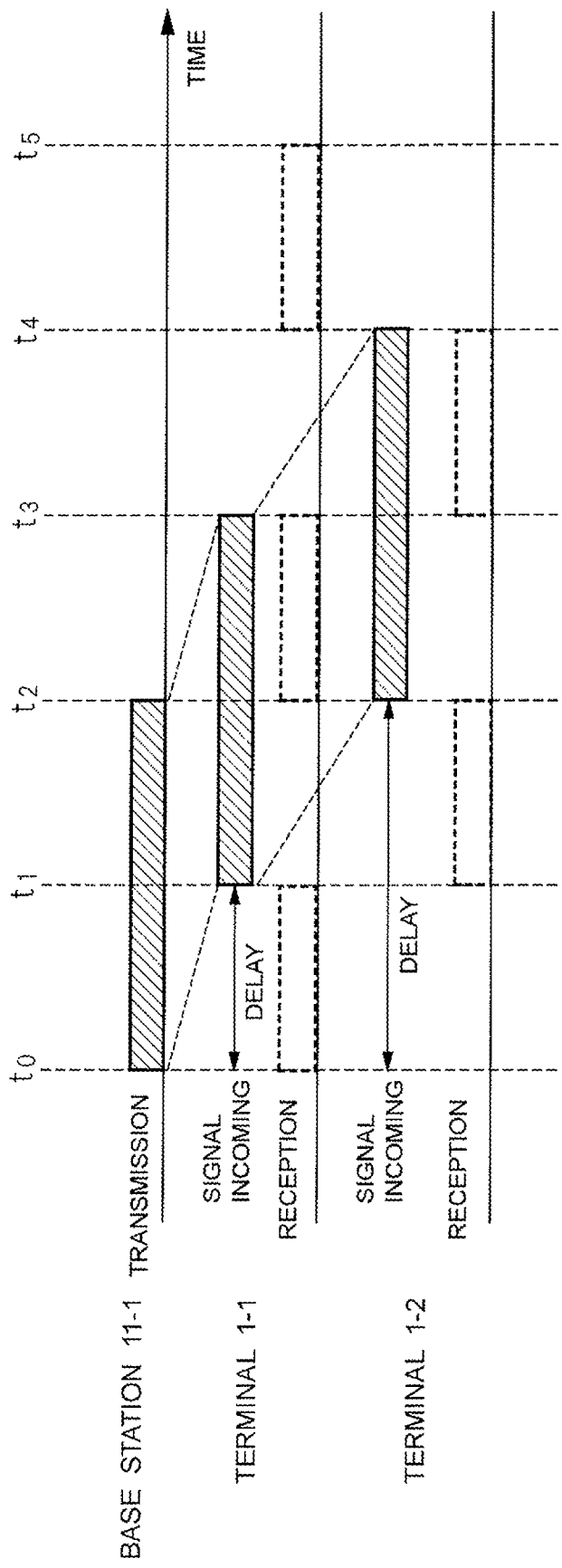
FIG. 9 is a sequence chart showing an example of an operation of transmitting and receiving the call signal from the base station according to a third exemplary embodiment.

FIG. 9 is a sequence chart showing an example of the operation of transmitting and receiving the call signal from the base station according to the third exemplary embodiment. An exemplary advantage according to the third exemplary embodiment is that the above-mentioned propagation delay problem can be solved by transmitting the call signal to be transmitted by the base station 11-1 in a frame length acquired by multiplying the call signal by the number of terminals connected to the cluster. The figure shows a case where the number of terminals is two. However, the problem can similarly be solved in a case where the number of terminals is three or more. The measures are valid even when there is a terminal to which the acoustic signal does not reach from the base station 11-1, among the terminals connected to the cluster.

Next, a fourth exemplary embodiment will be described. The configuration of a communication system of the fourth exemplary embodiment is equal to that shown in FIGS. 2 to 5. According to the third exemplary embodiment shown in the above-mentioned FIG. 9, the call signal from the base station 11-1 becomes relatively long. In an acoustic communication in the sea where a propagation delay becomes apparent, it is preferable that the signal length of the call signal be made as short as possible in many cases.

Figure 10:
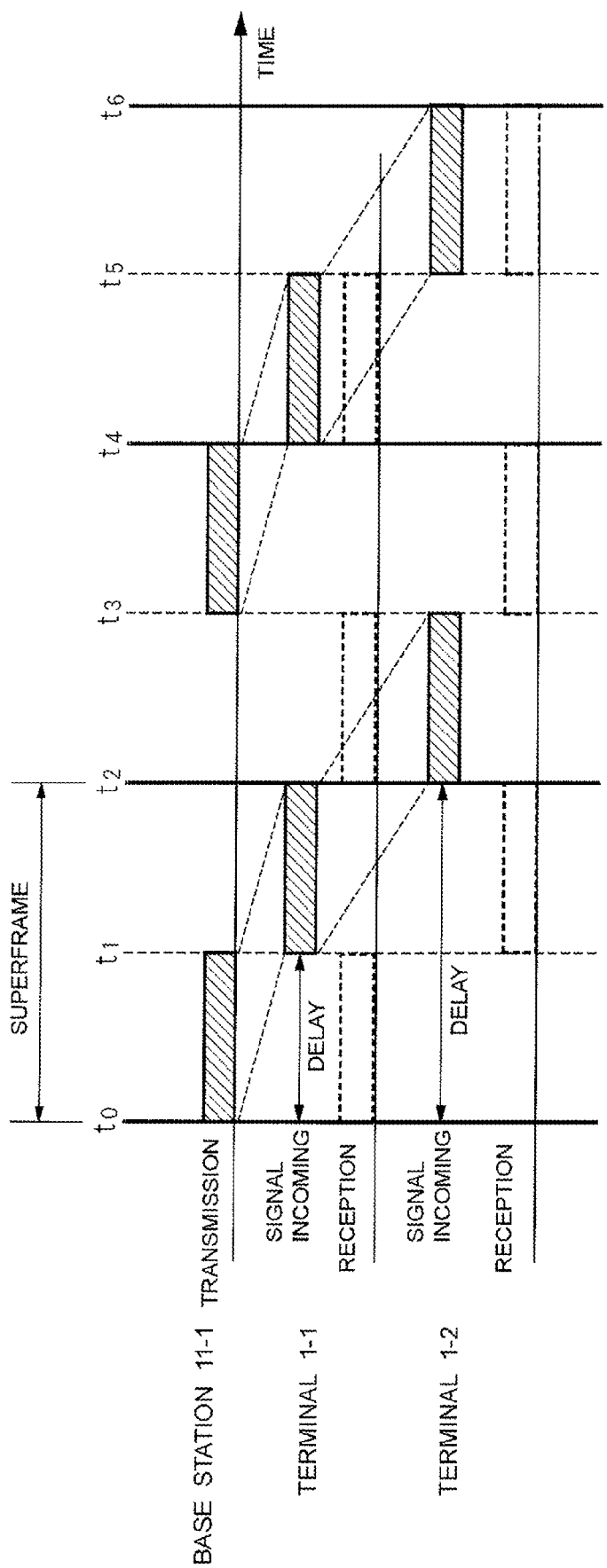
FIG. 10 is a sequence chart showing an example of an operation of transmitting and receiving the call signal from the base station according to a fourth exemplary embodiment.

FIG. 10 is a sequence chart showing an example of the operation of transmitting and receiving the call signal from the base station according to the fourth exemplary embodiment. Referring to the figure, in the fourth exemplary embodiment, a time interval (t0-t2, t2-t4, t4-t6 when the number of the terminals is 2) acquired by multiplying the basic frame time length (from t0 to t1) by the number of cluster-connected terminals is defined as a superframe. The base station 11-1 transmitting the call signal transmits the call signal of the basic frame time length on a superframe basis. An exemplary advantage according to the fourth exemplary embodiment is that any one of the terminals 1-1 and 1-2 can reliably receive the call signal provided that the call signal is transmitted varying its transmission section in each superframe, and two units of the superframe are transmitted.

Although the example shown in the figure is a case with two terminals, the present invention can be applied to a case with more terminals. In this case, it is required that the superframe length be the basic frame length multiplied by the number of the terminals connected to the cluster. Furthermore, reception by the terminals is performed on the basic frame length basis and in an alternate fashion concerning each terminal, thereby allowing the terminals as the cluster to respond to the call from the base station.

Although the base station is on a calling side and the terminals are on the reception side receiving the call in the first to fourth exemplary embodiments, the present invention can be applied to an inversely configured case. The exemplary configuration, operation and advantage according to the first to fourth exemplary embodiments are as described above, and may be summarized as will be described below.

A first exemplary advantage is that the power consumption of the terminal can be reduced in comparison with that of the related art. The reason is that the terminal monitors the call signal in association with the other terminal connected to the cluster.

A second exemplary advantage is that at least one of the terminals can receive the call signal from the base station even when acoustic wireless communication cannot be performed between one of the terminals and the base station owing to propagation delay of the acoustic signal. The reason is that the signal time length of the call signal is lengthened according to the number of the terminals connected to the cluster.

A third exemplary advantage is that an effect by a multipath signal at the called terminal can be alleviated. The reason is that the signal time length of the call signal is divided and transmitted.

Next, a fifth exemplary embodiment will be described. In the operation of the fourth exemplary embodiment shown in FIG. 10, the length of the call signal to be transmitted can be changed to any value that is at least twice the minimum time length necessary for reception by the terminal and shorter than or equal to the superframe length. However, it is required that a plurality of superframes be transmitted on one call. A method of transmitting the call signal will be described below.

Figure 11:
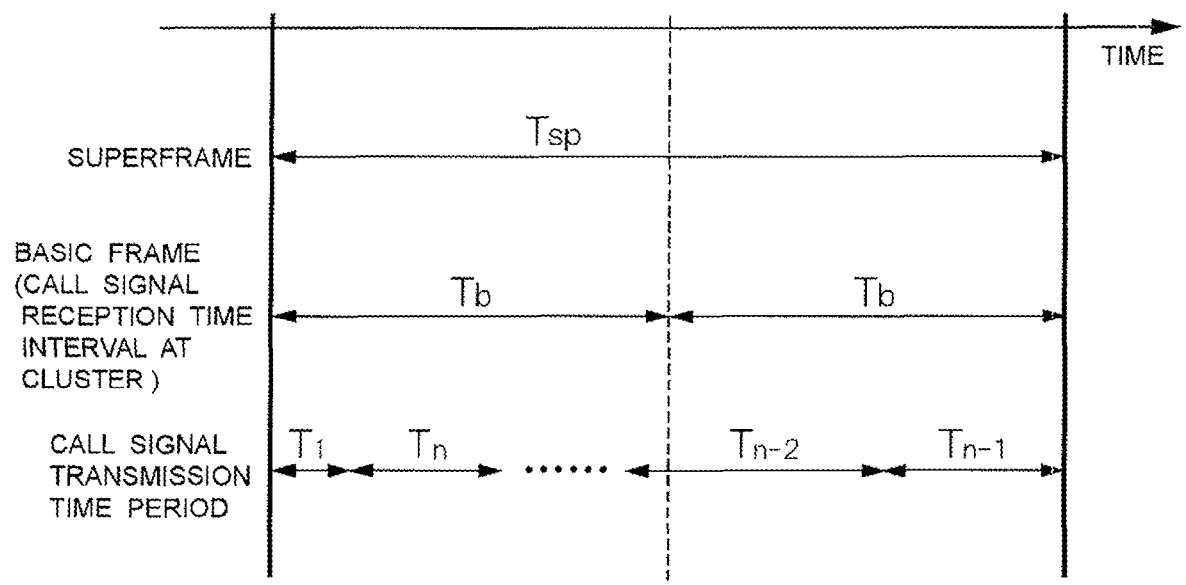
FIG. 11 is a diagram showing an exemplary modification of the signal length of the call signal from the base station according to a fifth exemplary embodiment.

FIG. 11 is a diagram showing an exemplary modification of the signal length of the call signal from the base station according to the fifth exemplary embodiment. Referring to the figure, call signal is transmitted from the base station only in a time interval Tn−1 (n is a natural number) per superframe. Relationship between the call signal transmission time interval Tn−1 and the superframe (Tsf) in representation in a mathematical expression are as follows:

$$T0+T1+\ldots+Tn-2+Tn-1=Tsf \text{ and}$$

$$Tn-1>2\times\text{minimum receivable time period} \quad (1)$$

where it is required that relationship between the subframe length Tn−1 and the reception time period of intermittent reception (hereinafter represented as "reception window") be that the subframe length Tn−1 is at least twice the minimum receivable time interval during which the terminal can receive. The reason will be described with reference to FIG. 12.

Figure 12:
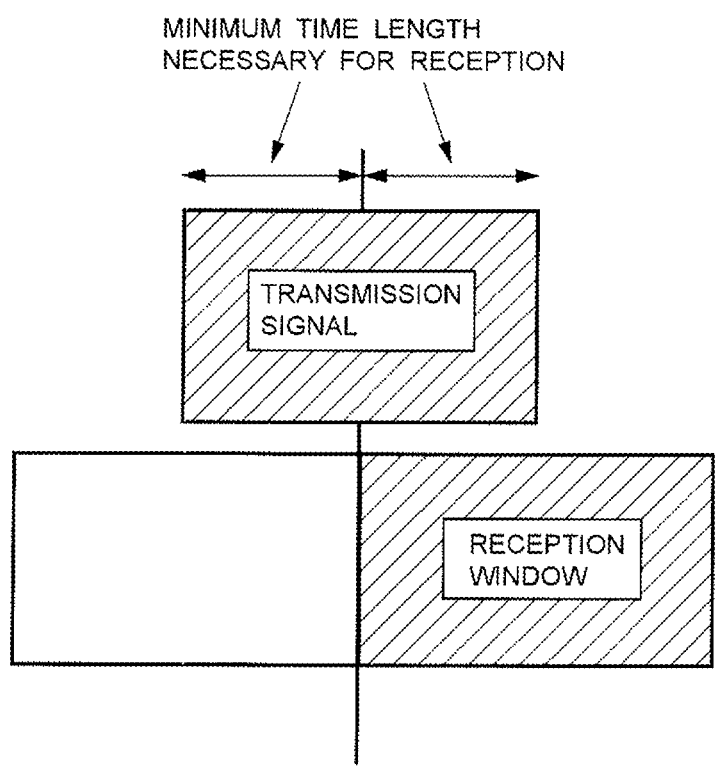
FIG. 12 is a diagram showing relationship between a transmission signal and a reception window.

FIG. 12 is a diagram showing the relationship between the transmission signal and the reception window. The figure shows a case where the positions of the transmission signal and the reception window of intermittent reception are in the worst situation, and shows a status where a half of the transmission signal is received. More specifically, if the timing of the transmission signal is shifted to the right direction with respect to the timing shown in the figure, the overlap with the reception window widens, thereby increasing the reception time period. On the other hand, if the timing of the transmission signal is shifted to the left direction with respect to the timing shown in the figure, a region in another superframe where the overlap with the reception window becomes wider than a half of the transmission signal necessarily appears.

Thus, even in the worst case concerning the reception timing between reception window and the incoming timing, the overlap between the transmission signal and the reception window is a half of each time length. An exemplary advantage according to the fifth exemplary embodiment is that the time length of the transmission signal twice the minimum time length necessary for reception (a half of reception time period represented in the reception window) reliably enables the call signal to be received.

It should be noted that FIG. 11 shows the case where the number of cluster-connected terminals is two. Relationship between the superframe length Tsf and the basic frame length Tb with m (m is a natural number) being the number of cluster-connected terminals will be as described below. It is required to increase the superframe length in proportion to the number of terminals.

$$Tsf=m\times Tb \quad (2)$$

Tb represents the call signal reception time interval with respect to the cluster. As shown in FIG. 8, since the terminals 1-1 and 1-2 alternately receive the call signal in t0-t1, t1-t2, ..., (tn−1)-tn, the call signal is received at the Tb time interval with respect to the cluster, where Tb is each time interval.

It is unnecessary that the subframes T0, T1, ..., Tn−2, Tn−1 be sequentially transmitted. For instance, Tn−3, T1, T5, ..., T1 are acceptable and transmission can be performed from any one of the time intervals provided that the time positions in the superframe are kept under the condition represented by expressions (1) and (2).

Figure 13:
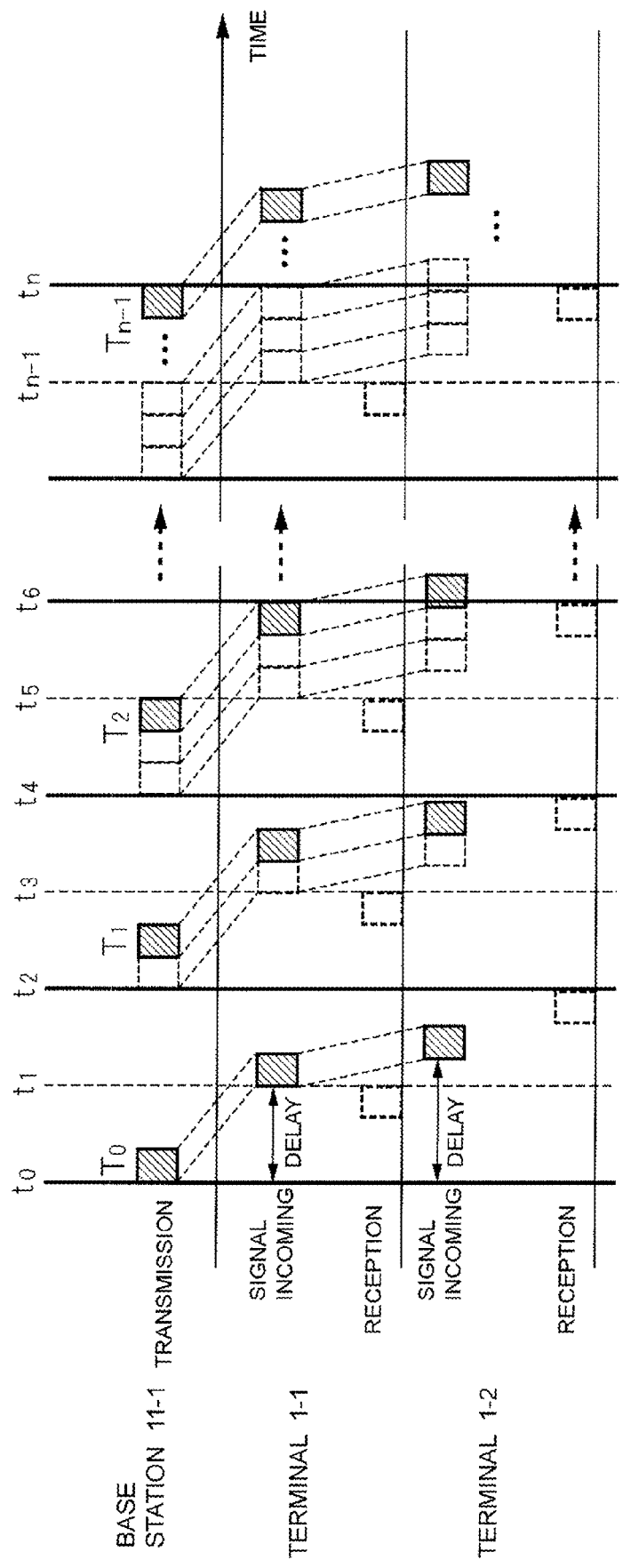
FIG. 13 is a sequence chart showing an example of an operation of transmitting and receiving the call signal from the base station according to a sixth exemplary embodiment.

Next, a sixth exemplary embodiment will be described. FIG. 13 is a sequence chart showing an example of the operation of transmitting and receiving the call signal from the base station according to the sixth exemplary embodiment. The sixth exemplary embodiment relates to an example of a method of transmitting the call signal when the time length of the call signal from the base station is shorter than the basic frame time length. The number of terminal connections of the cluster is two. In the figure, the superframe is t2(n−1)-t2(n) (n is natural number), and the basic frame is t(n−1)-t(n).

The superframe is divided into n frames, T0-T(n−1). The base station transmits the call signal in each subframe. In this exemplary embodiment, the terminal performs the intermittent reception, and the time interval of the reception window and the subframe length are aligned with each other. The base station sequentially transmits the call signal on each superframe at a relative time interval, T0, T1, T2, ..., T(n−1) only for the subframe length concerned.

It is understood that, although the subframe T0 cannot be received by the terminals 1-1 and 1-2, the subframes T1 and T2 are received by the terminal 1-2 and T(n−1) is received by the terminal 1-1. Since the reception window time period is set periodically, transmission of the number of division n of the superframes from the base station allows the call signal to be reliably received in any one of the superframes. Furthermore, if any one of the terminals 1-1 and 1-2 receives the acoustic signal from the base station, the call signal can reliably be received with respect to the cluster.

An exemplary advantage according to the sixth exemplary embodiment is that an influence of the multipath and the like can be reduced by shortening the transmission time period of the call signal. For instance, a method can be considered that the length of the call signal from the base station is changed according to the length of an impulse response observed in a reception terminal.

Figure 14:
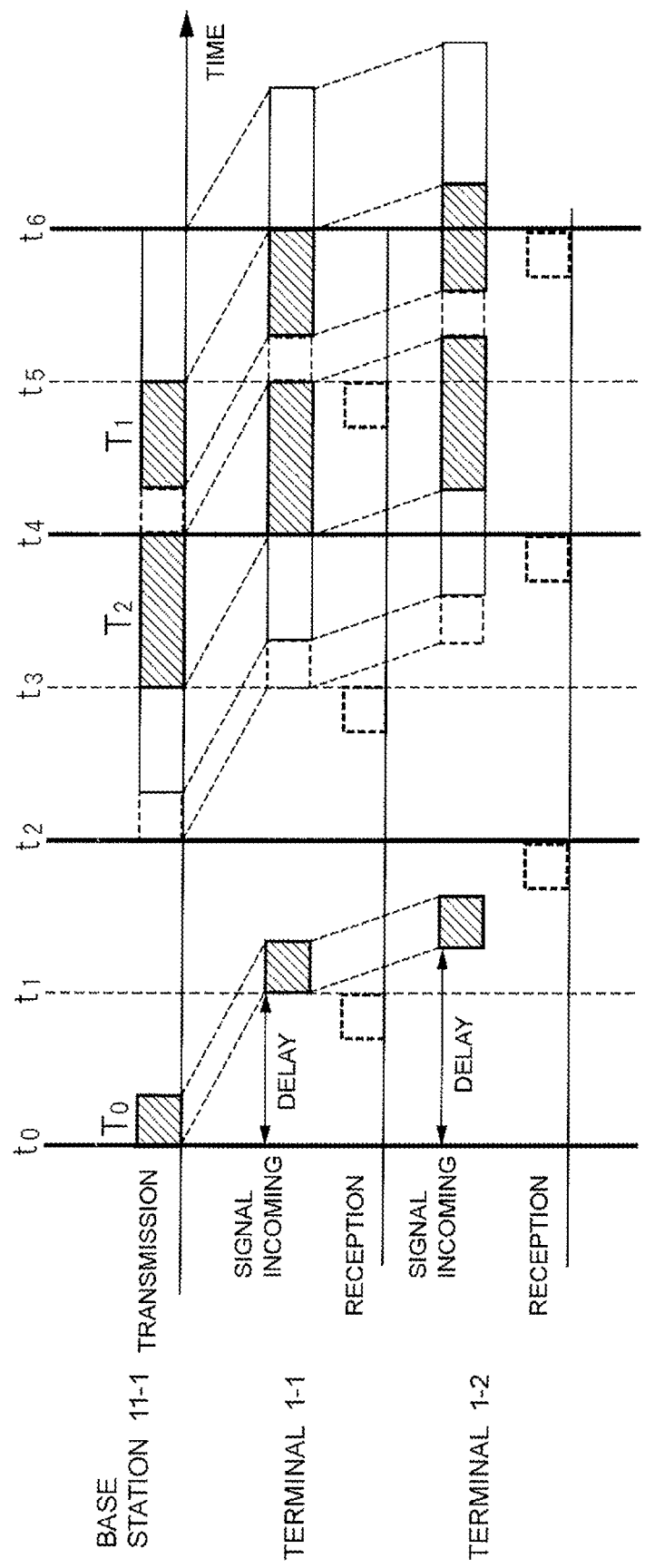
FIG. 14 is a sequence chart showing an example of an operation of transmitting and receiving the call signal from the base station according to a seventh exemplary embodiment.

Next, a seventh exemplary embodiment will be described. FIG. 14 is a sequence chart showing an example of the operation of transmitting and receiving the call signal from the base station according to the seventh exemplary embodiment. The seventh exemplary embodiment relates to an example of a method of dividing the superframe into subframes having a random time length and transmitting the call signal from the base station at a random relative time position.

Referring to the figure, the superframe is divided into three subframes T0, T1 and T2 having different lengths. T0 is transmitted in the superframes T0-t2, T2 is transmitted in the t2-t4, and T1 is transmitted in the t4-t6. In this exemplary embodiment, the order of transmitting T1 and T2 is inverted. For instance, in order to reduce the influence of multipath, it is preferable to minimize the transmission signal. On the other hand, in order to call the terminal as soon as possible, it is preferable to maximize the transmission signal. Addressing the contradictory requirements, a method can be considered that the transmission signal time length is initially shortened and then gradually lengthened. An exemplary advantage according to the seventh exemplary embodiment is that the influence of the multipath can be reduced and the terminal can immediately be called by making the transmission signal time length of the call signal from the base station be initially shortened and then gradually be lengthened.

Furthermore, when a multipath having a long delay time exists, a method can be considered that a transmission blank period is inserted between the superframes instead of transmitting the subframes using the consecutive superframes.

Figure 15:
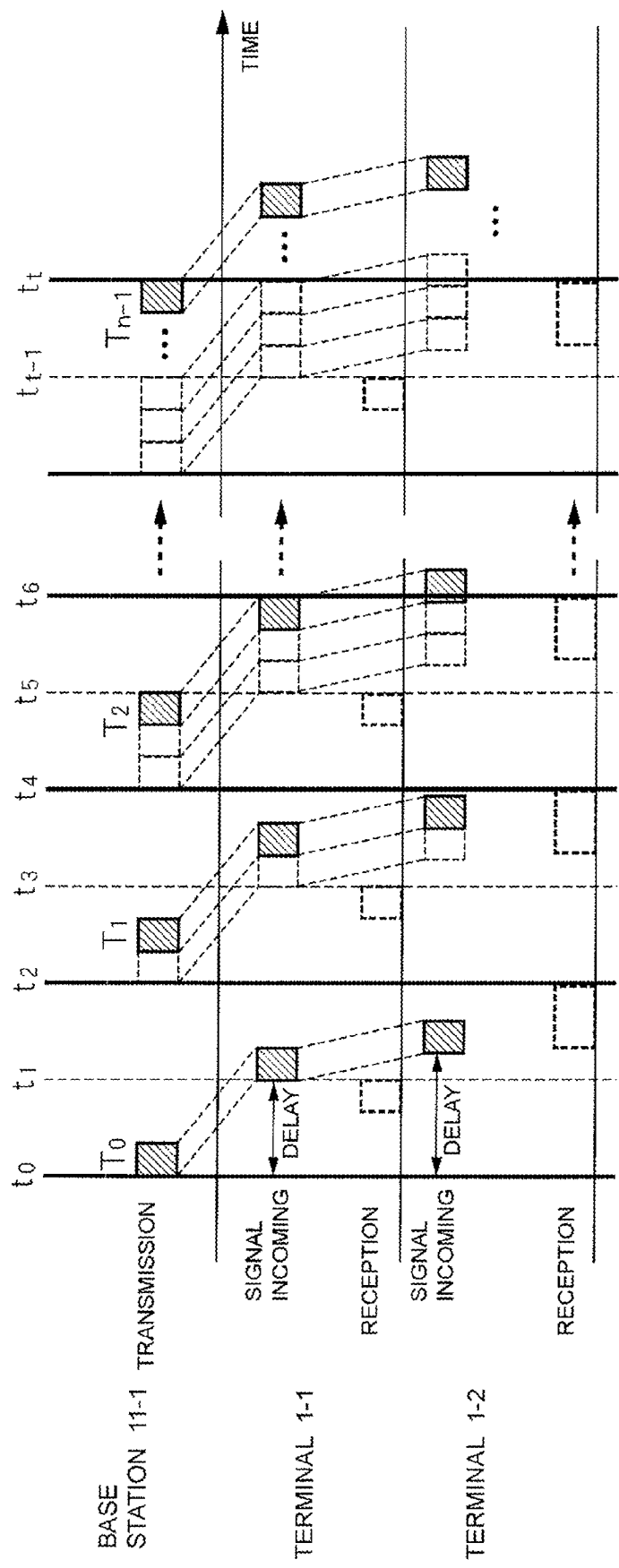
FIG. 15 is a sequence chart showing an example of an operation of transmitting and receiving the call signal from the base station according to an eighth exemplary embodiment.

Next, an eighth exemplary embodiment will be described. FIG. 15 is a sequence chart showing an example of the operation of transmitting and receiving the call signal from the base station according to the eighth exemplary embodiment. The eighth exemplary embodiment relates to an example of a method of varying the time interval lengths of the reception windows on a terminal-to-terminal basis. For instance, concerning the terminals 1-1 and 1-2, power consumption of the terminal 1-1 increases when frequency of receiving the call signal from the base station 11-1 becomes higher at the terminal 1-1 than the terminal 1-2 because of the propagation delay time period. Accordingly, the time interval lengths of the reception windows are caused to vary from one terminal to another in order to equalize the power consumption at each terminal in the cluster.

An exemplary advantage according to the eighth exemplary embodiment is that the time interval length of the reception window on the terminal where the reception frequency is relatively low but the propagation delay amount between the terminal and the base station is relatively large is set to be relatively long, thereby facilitating the terminal to receive the call signal in comparison with the other terminal in the cluster. This causes the terminal to cover a part of increasing power and enables prevention of the power consumption from concentrating into the other terminal.

Figure 16:
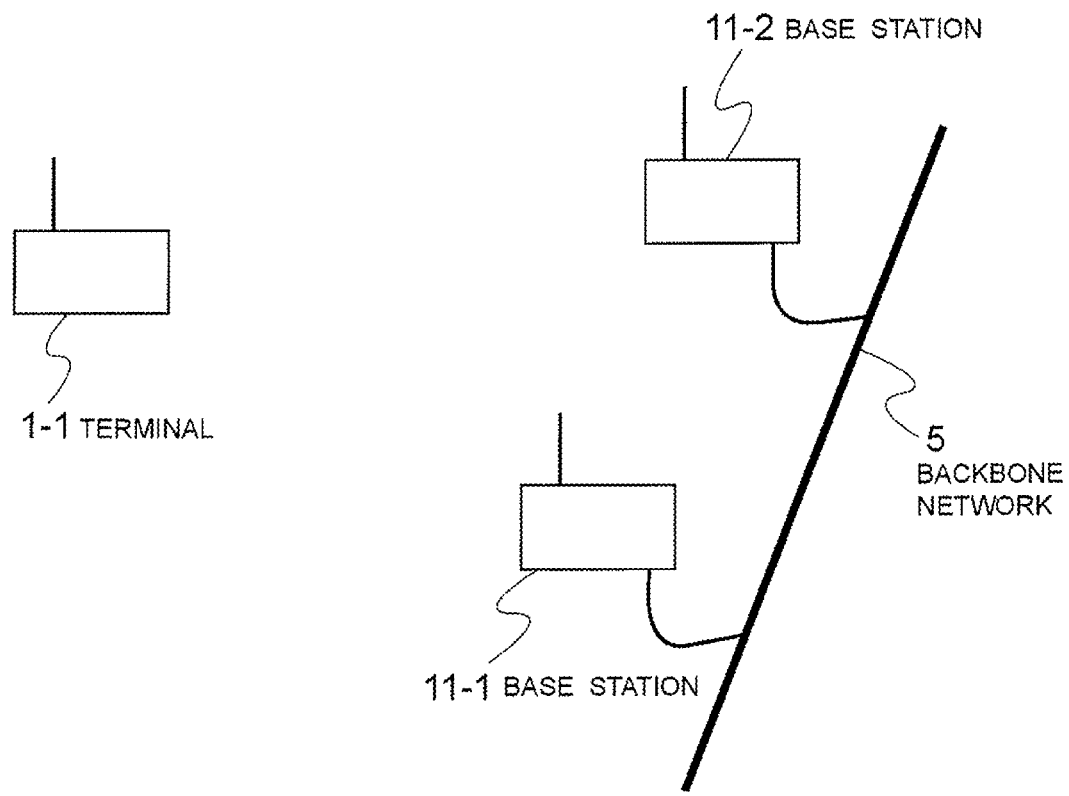
FIG. 16 is a diagram showing a configuration of the base station and the terminal according to a ninth exemplary embodiment.

Next, a ninth exemplary embodiment will be described. FIG. 16 is a diagram showing a configuration between the base stations and the terminal in the ninth exemplary embodiment. The ninth exemplary embodiment relates to a method of calling one terminal from two base stations.

As described above, a method of dividing the superframe as shown in FIG. 13 (sixth exemplary embodiment) and randomly selecting the subframe relative time position as shown in FIG. 14 (seventh exemplary embodiment) has the exemplary advantage of alleviating the hidden terminal problem in the CSMA in the related wireless system where m=1 (the number of terminals connected to the cluster is one).

Referring to FIG. 16, there are represented one terminal 1-1, two base stations 11-1 and 11-2, and the backbone network 5. The two base stations 11-1 and 11-2 are connected to the backbone network 5.

In the figure, entire wireless communication is performed in the same frequency band. Accordingly, it is prescribed that, when transmission signals from different base stations temporally overlap, the overlapped portion cannot be received. Furthermore, here is a situation where both of wired and wireless communication paths of the base stations 11-1 and 11-2 are blocked and the hidden terminal problem occurs.

Figure 17:
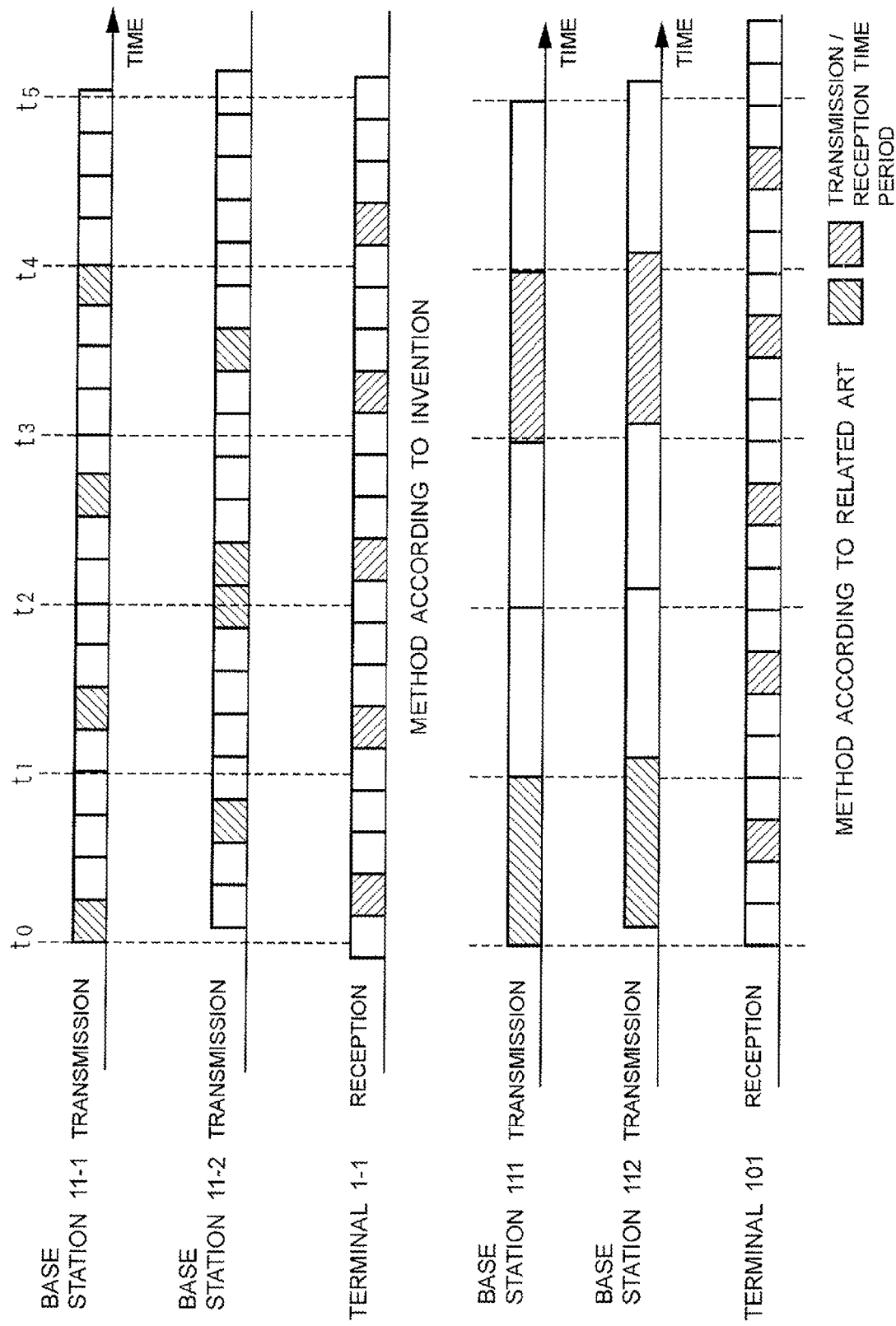
FIG. 17 is a sequence chart showing an example of a situation of transmitting and receiving the call signal according to the ninth exemplary embodiment.

FIG. 17 is a sequence chart showing an example of the situation of transmitting and receiving the call signal according to the ninth exemplary embodiment. It should be noted that the method of related art is represented as well as the method according to the present invention for the sake of convenience.

Referring to the figure, it is provided that call requests are simultaneously issued in t0-t1 from the base station. Since the related art transmits the call signal over whole of the basic frame (superframe when m=1), the signals completely overlap in the reception window of the terminal 101 and the call signal cannot be received.

In contrast to that, an exemplary advantage according to the ninth exemplary embodiment is that the transmission time intervals (relative time positions of subframes) of the respective base stations 11-1 and 11-2 are shifted to each other in the basic frame, thereby enabling the call signals of the base stations 11-1 and 11-2 to be received in t1-t2 and t2-t3, respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system, comprising:
   a plurality of wireless communication terminals connected to each other in a wired fashion and configuring a cluster;
   a controller configuring the cluster together with the plurality of the wireless communication terminals; and
   a plurality of wireless communication base stations,
   wherein each of the wireless communication base stations intermittently transmits a call signal to the plurality of the wireless communication terminals, and varies transmission timing from one wireless communication base station to another, the plurality of the wireless communication terminals receive the call signals from the plurality of the wireless communication base stations in a time division and alternate fashion, the controller determines a wireless communication terminal to communicate with the wireless communication base station based on information from the wireless communication terminals which receive the call signals, a time length to communicate the call signals is a base frame time length, a part of the basic frame time length or a multiple of the base frame time length, the base frame length occurs over a plurality of time intervals, and acoustic communication by means of an acoustic wave is used for communication between the wireless communication base station and the wireless communication terminal.

2. The wireless communication system according to claim 1, wherein a time length where the wireless communication base station transmits the call signal is a basic frame time length, and a time length where the wireless communication terminal receives the call signal from the base station is also the basic frame time length.

3. The wireless communication system according to claim 1, wherein a time length where the wireless communication terminal receives the call signal from the wireless communication base station is less than a basic frame time length.

4. The wireless communication system according to claim 1, wherein a time length where the wireless communication base station transmits the call signal is twice a basic frame time length.

5. The wireless communication system according to claim 1, wherein a value of multiplying a basic frame time length by the number of the wireless communication terminals defines a superframe, and the wireless communication base station transmits the call signal of the basic frame time length on a superframe-to-superframe basis.

6. The wireless communication system according to claim 5, wherein the transmission of the call signal of the basic frame time length is performed with variation in call signal transmission time interval on a superframe-to-superframe basis.

7. The wireless communication system according to claim 5, wherein a time length where the wireless communication base station transmits the call signal is less than the basic frame time length.

8. The wireless communication system according to claim 1, wherein a length of a transmission time at the wireless communication base station is at least twice a minimum time length necessary for reception at the wireless communication terminal and shorter than or equal to a superframe length.

9. A method of calling a terminal in a wireless communication system that comprises a plurality of wireless communication terminals connected to each other in a wired fashion and configuring a cluster, a controller configuring the cluster together with the plurality of wireless communication terminals, and a plurality of wireless communication base stations, wherein the wireless communication base station intermittently transmits a call signal to the plurality of the wireless communication terminals, and varies transmission timing from one wireless communication base station to another, the plurality of the wireless communication terminals receive the call signals from the plurality of the wireless communication base stations in a time division and alternate fashion, the controller determines a wireless communication terminal to communicate with the wireless communication base station based on information from the wireless communication terminals which receive the call signals, a time length to communicate the call signals is a base frame time length, a part of the basic frame time length or a multiple of the base frame time length, the base frame length occurs over a plurality of time intervals, and acoustic communication by means of an acoustic wave is used for communication between the wireless communication base stations and the wireless communication terminals.

10. The method of calling a terminal according to claim 9, wherein a time length where the wireless communication base station transmits the call signal is a basic frame time length, and a time length where the wireless communication terminal receives the call signal from the base station is also the basic frame time length.

11. The method of calling a terminal according to claim 9, wherein a time length where the wireless communication terminal receives the call signal from the wireless communication base station is less than a basic frame time length.

12. The method of calling a terminal according to claim 9, wherein a time length where the wireless communication base station transmits the call signal is twice a basic frame time length.

13. The method of calling a terminal according to claim 9, wherein a value of multiplying a basic frame time length by the number of the wireless communication terminals defines a superframe, and the wireless communication base station transmits the call signal of the basic frame time length on a superframe-to-superframe basis.

14. The method of calling a terminal according to claim 13, wherein the transmission of the call signal of the basic frame time length is performed with variation in call signal transmission time interval on a superframe-to-superframe basis.

15. The method of calling a terminal according to claim 13, wherein a time length where the wireless communication base station transmits the call signal is less than the basic frame time length.

16. The method of calling a terminal according to claim 9, wherein a length of a transmission time at the wireless communication base station is at least twice a minimum time length necessary for reception at each of the plurality of the wireless communication terminals and shorter than or equal to a superframe length.

17. A wireless communication system, comprising:
a plurality of first wireless communication means connected to each other in a wired fashion and configuring a cluster;
a controlling means configuring the cluster together with the plurality of the first wireless communication means; and
a plurality of second wireless communication means,
wherein each of the second wireless communication means intermittently transmits a call signal to the plurality of the first wireless communication means, and varies transmission timing from one second wireless communication means to another, and
the plurality of the first wireless communication means receive the call signals from the plurality of the second wireless communication means in a time division and alternate fashion,
the controlling means determines a first wireless communication means to communicate with the second wireless communication means based on information from the first wireless communication means which receive the call signals, a time length to communicate the call signals is a base frame time length, a part of the basic frame time length or a multiple of the base frame time length, the base frame length occurs over a plurality of time intervals, and acoustic communication by means of an acoustic wave is used for communication between the first wireless communication means and the second wireless communication means.

* * * * *